United States Patent [19]

Briltz

[11] 3,886,073

[45] May 27, 1975

[54] SEWAGE AND EFFLUENT TREATING SYSTEM

[76] Inventor: Raymond P. Briltz, P.O. Box 342, Grenfell, Saskatchewan, Canada

[22] Filed: Apr. 4, 1974

[21] Appl. No.: 457,794

Related U.S. Application Data

[63] Continuation of Ser. No. 160,473, July 7, 1971, abandoned.

[30] Foreign Application Priority Data

July 6, 1971 Canada................................ 117411

[52] U.S. Cl. ................. 210/136; 210/201; 210/205; 210/219; 210/320
[51] Int. Cl. .......................... B01d 21/08; C02b 1/20
[58] Field of Search...... 210/49, 201, 202, 205–208, 210/219, 252, 319, 320, 521, 522, 136, 116; 259/1, 60, 99, 112

[56] References Cited
UNITED STATES PATENTS

| 2,190,596 | 2/1940 | Dorr | 210/49 |
|---|---|---|---|
| 2,389,605 | 8/1945 | Carter | 210/49 X |
| 2,497,392 | 2/1950 | Breukel | 210/521 |
| 3,399,135 | 8/1968 | Conley et al. | 210/202 X |
| 3,426,904 | 2/1969 | Kotsuta et al. | 210/522 X |
| 3,545,619 | 12/1970 | Ettlich et al. | 210/202 X |

*Primary Examiner*—Thomas G. Wyse
*Attorney, Agent, or Firm*—Stanley G. Ade

[57] ABSTRACT

Effluent is pumped from the primary sewage treatment location through a module at which time a flocculating agent is introduced into the sewage. The sewage and flocculent are agitated and thoroughly mixed in this module and it then passes to a retention of flocculent module at which time the majority of the flocculated material is separated out by baffles. The deflocculated effluent then passes to conventional first and second stage filtering tanks. Means are provided to back flow the modules to remove the flocculated material and cleanse the modules when necessary.

8 Claims, 8 Drawing Figures

PATENTED MAY 27 1975

3,886,073

SHEET 2

INVENTOR.
RAYMOND P. BRILTZ
BY
Kent & Ade 3,886,073

SEWAGE AND EFFLUENT TREATING SYSTEM

This application is a continuation of application Ser. No. 160,473, filed July 7, 1971 and now abandoned.

BACKGROUND TO THE INVENTION

Conventionally sewage is first pretreated in lagoons to settle out solids and it then passes through first and second filtering tanks or the like which attempt to remove remaining solids. The effluent is then allowed to pass to the disposal outlets which may be rivers, streams or the like.

Unfortunately this effluent still contains a relatively large quantity of contaminents in solution which are not removed either by settling or filtering processes.

SUMMARY OF THE INVENTION

The aims and objects of the system and apparatus are to produce an effluent that is fit for human consumption out of primary treated sewage reservoirs, in the shortest possible time, using an arrangement of chemicals to flocculate contaminants in solution and internal baffles to separate the flocculated material. The cleansed effluent may then pass through conventional first and second filtering tanks thus producing a compact secondary and tertiary treatment plant in order to reduce pollution of the aquifers.

Another object of the invention is to provide means whereby the cleansed effluent may be pumped back in a reverse action through the modules in order to cleanse same when necessary.

A yet further object of the invention is to provide apparatus of the character herewithin described in which the relative sizes of the modules is such that the sewage is held or maintained a sufficient time in order to allow flocculating chemicals to flocculate the contaminants within the sewage.

A yet further object of the invention is to provide a device of the character herewithin described which is simple in construction, economical in manufacture and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, constructuon, composition, arrangement or combination of parts, or new use of any of the foregoing, herein exemplified in one or more specific embodiments of such concept, reference being had to the accompanying Figures in which:

DRAWINGS

In the drawings like characters of reference indicate corresponding parts in the different figures.

PRELIMINARY DESCRIPTION

A secondary sewage treatment apparatus includes means 11 to add a flocculation chemical to sewage after it has been treated in the primary sewage area 12. Means 13 are provided to agitate the sewage and the flocculating chemicals and further means 14 are provided to separate the flocculated material from the liquid effluent which then passes to conventional filtering tanks 14A.

DETAILED DESCRIPTION

Figure 1:
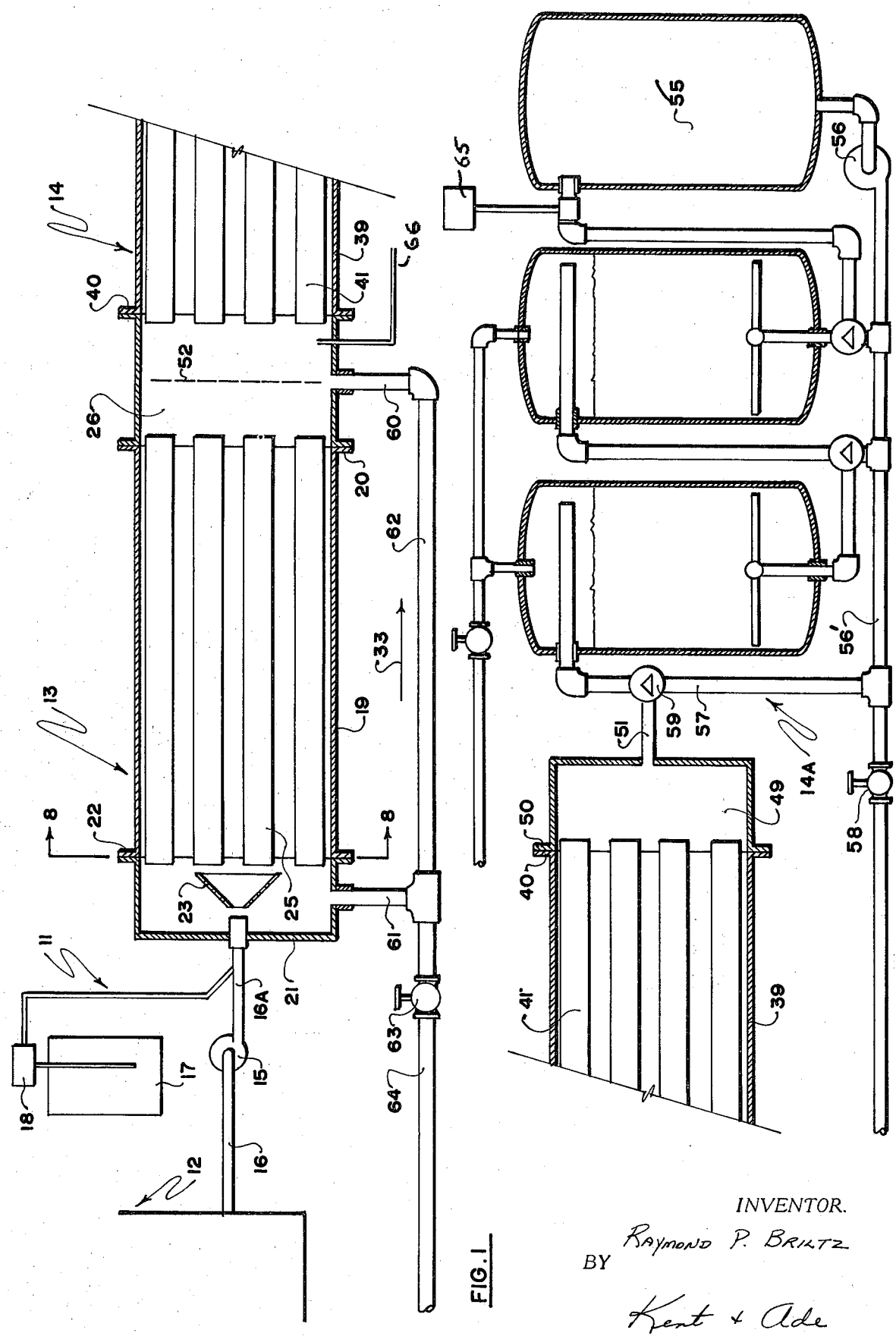
FIG. 1 is a schematic view of the treatment system in the form of a process and flow diagram.
Figure 2:
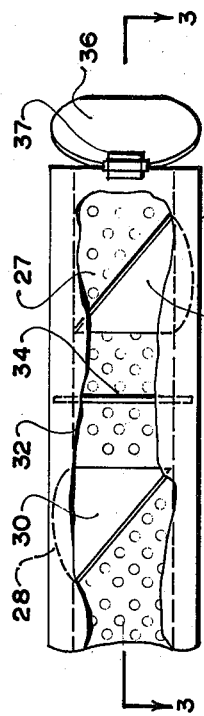
FIG. 2 is an enlarged fragmentary top view of one of the conduits of the agitating module with the casing broken away in part to show the interior thereof.
Figure 3:
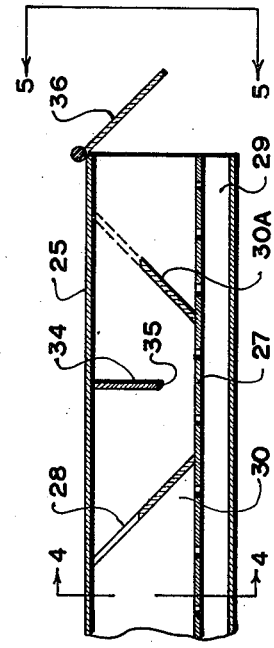
FIG. 3 is a longitudinal section substantially along the line 3—3 of FIG. 2.

Reference should first be made to FIG. 1 in which 12 illustrates schematically a holding unit for primary treated sewage. This holding unit may be a reservoir or tanks as desired.

A pump 15 pumps sewage from the holding area 12 via conduit 16 and a conduit 16A extends between the pump and the means to agitate collectively designated 13.

Reference character 17 illustrates a container which holds flocculating chemicals and a pump 18 injects metered amounts of these chemicals into the line or conduit 16A.

The flocculating chemical utilized will of course depend upon the contaminants held in solution within this sewage being treated. However, there are many well know flocculents which could be used such as soda ash, silicates, polyolectrolites and liquid alum.

The means to agitate the chemical and sewage indicated by reference character 13 consists of a module which in turn is connected to a further module comprising the means to separate the flocculated material indicated by reference character 14.

The module 13 consists of a cylindrical casing 19 having a flange 20 at either end and an intake header 21 is secured by a similar flange to the intake end 22 of the casing.

Conduit 16A connects centrally into this intake header and a perforated dispersal cone 23 is situated immediately in front of the connection of the conduit 16A with the header so that the mixture of sewage and flocculating chemicals are evenly distributed through the agitating module 13.

End plates 24 are provided at each end of the casing and a plurality of conduits 25 extend through the casing between end plates 24 and communicate with the intake header 21 at one end of the casing and an outlet baffle chamber 26 secured to the other end of the casing by similar flanges 20.

Each of the conduits 25 is shown in detail in FIGS. 2 to 5 inclusive. The conduits are preferably cylindrical and made of a non-corrosive material such as stainless steel.

Each conduit is provided with a horizontally situated perforated partition baffle 27 which spans the conduit and extends from end to end. This perforated partition baffle separates the conduit into a normal flow agitation portion 28 above the partition baffle 27 and a reverse flow cleaning portion 29 below the partition baffle 27, it being understood that portion 28 is considerably larger in volume than portion 29 due to the positioning of the partition baffle 27.

Situated within the normal flow agitating portion 28 is a plurality of baffles which include a first baffle 30 which is substantially triangular in front elevation and is secured by the lower edge thereof to the partition baffle 27 and by the curved side 31 thereof to the wall of the portion 28. The diagonal edge 32 extends between one side of the partition baffle 27 diagonally upwardly to the upper end of the curved edge 31.

This baffle is inclined towards the intake header end of the conduits 25. That is to say they are inclined at an angle towards the normal direction of flow of sewage therethrough which is indicated by arrow 33.

A similar baffle 30A is also situated within the portion 28 of the conduit which is similar in configuration to baffle 30 but is oppositely handed or reversed with respect to baffle 30. However, this baffle also inclines in the same direction as baffle 30, namely, at an angle towards the normal sewage flow therethrough.

Situated between baffles 30 and 30A is a vertical baffle 34 which forms part of a segment of the cylindrical conduit 25. This baffle is secured by the curved edge thereof to the upper wall of a portion 28 of the conduit and terminates spaced from the partition baffle 27 as indicated by reference character 35.

The provision of these baffles cause severe agitation or turbulence of the sewage passing therethrough thus thoroughly mixing the flocculating chemicals and ensuring or assisting in the flocculating action thereof. The length of the conduits and the volume thereof is such that when the sewage reaches the outlet baffle chamber 26, flocculation has commenced.

Figure 5:
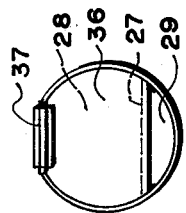
FIG. 5 is an end view of FIG. 3 along the line 5—5 of FIG. 3.
Figure 4:
FIG. 4 is a cross sectional view substantially along the line 4—4 of FIG. 3.

A flap valve 36 is hinged as at 37 to the upper edge of the portion 28 of the conduit at the discharge end thereof and this flap valve normally rests against the separating or dividing partition baffle 27 as shown in FIG. 5. However, the hinging is such that sewage passing in the normal direction, namely in the direction of arrow 33, opens this flap valve whereas any back pressure or movement of effluent in the opposite direction closes off the portion 28 as will hereinafter be described.

Figure 8:
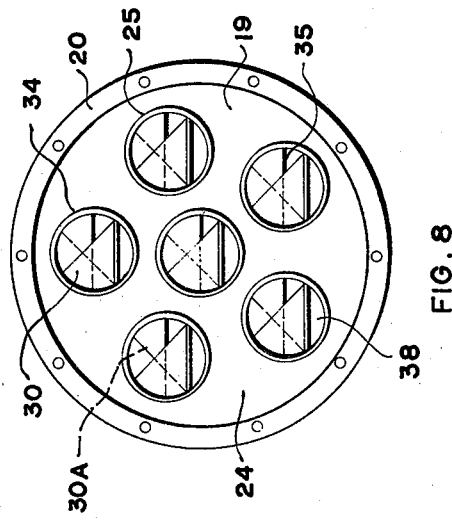
FIG. 8 is an enlarged end view of the agitating module per se along the line 8—8 of FIG 1.

Finally, it should be observed that the intake end of the reverse flow cleaning portion 29 of the conduits is closed as illustrated in FIG. 8 by reference character 38.

The conduits and various baffles are preferably designed so that they can be readily dismantled for replacement if desired.

Dealing next with the flocculent module 14, this also consists of a cylindrical casing 39 having a flange 40 at either end thereof and a baffle chamber 26, being similarly flanged, bolts to this flange as clearly shown in FIG. 1, it being understood that the baffle chamber 26 acts as a connecting portion between modules 13 and 14.

Module 14 is also provided with a plurality of conduits 41 extending therethrough between end plates (not illustrated) which are similar to end plates 19 hereinbefore described.

Figure 6:
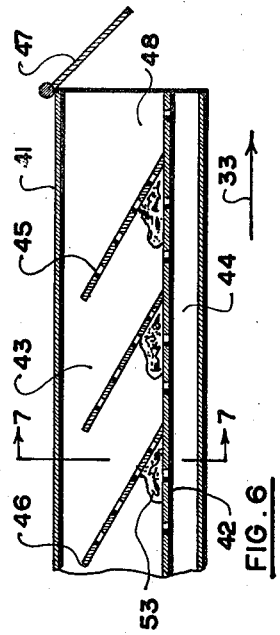
FIG. 6 is a longitudinal section of one of the conduits of the flocculent module substantially along the line 6—6 of FIG. 7.
Figure 7:
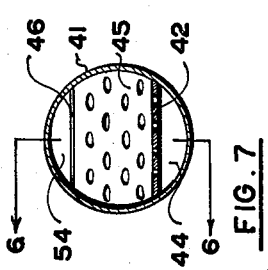
FIG. 7 is a cross sectional view substantially along the line 7—7 of FIG. 6.

Details of these conduits 41 are shown in FIGS. 6 and 7.

A perforated horizontally situated partition baffle 42 spans the conduits in a position similar to the partition similar to the partition baffle 27 hereinbefore described and separates the conduits into a normal flow flocculent trapping portion 43 above the partition baffle 42 and a reverse flow cleaning portion 44 below the partition baffle 42.

Each conduit includes a plurality of baffles 45 which are perforated and which are secured by the lower edges thereof to the partition baffle 42 and extend into the portion 43 of the conduits. These baffles extend or span the conduits but terminate spaced from the upper wall as indicated by reference character 46 and shown in FIG. 7. The baffles 45 are in spaced and parallel relationship one with the other and are inclined att an angle in a direction against the normal flow of effluent therethrough indicated by reference character 33.

A hinged effluent-flow-operated flap valve 47 is provided at the outlet end 48 of each of the conduits 41 and this covers the normal flow flocculent trapping portion 43 resting against the end of the partition baffle 42 by gravity.

The construction is similar to flap valves 36 and they operate in a similar manner.

An outlet header 49 is secured to flange 40 by a corresponding flange 50 and an outlet conduit 51 connects to the settling or filtering tanks collectively designated 14A which are conventional in construction and operation.

A perforated baffle 52 spans the baffle chamber 26 and the arrangement of apertures in the baffle assures an even flow of the effluent from the agitating module 13 to the flocculent module 14.

In operation, the treated sewage is pumped by pump 15 to the inlet header 21 and the necessary flocculent chemical is added in a metered amount just prior to entry to the header 21.

The cone 23 distributes the sewage evenly to the conduits 25 and as it passes through these conduits it is completely agitated thus initiating the flocculating action. It then passes to the baffle chamber 26 and through the perforated screen 52 into the module 14.

At this point, due to the time factor which can be controlled by dimensions and by the capacity of pump 15, the flocculating action starts and the flocculated material is trapped by the baffles 45 within the angle defined by these baffles and the partition baffle 42. Such trapped flocculent is illustrated by reference character 53 in FIG. 6.

It should be understood that the perforations within the partition baffle 42 are small enough to prevent the flocculated material from passing therethrough.

The upper edges 46 of baffles 45 act as a dam or weir and permit clear effluent to pass over the upper edges thereof within the space indicated in FIG. 7 and identified by reference character 54. This clear effluent which may contain some small particles of flocculent, then passes to the filter tanks shown in 14A which eliminates any solids which may be held in suspension within the effluent. The clear effluent is then held within reservoir 55 for disposal into the aquifers as necessary.

When it is desired to clean the modules 13 and 14, a pump 56 pumps clear effluent from the reservoir 55 through a conduit 56' and into the module 14 via a conduit 57. In this connection a gate valve 58, normally used for the distribution of the clear effluent from reservoir 55, is closed, and a gate valve 59 normally routing the effluent from module 14 to the tanks 14A is also set so that clear effluent passing through conduit 57 enters the outlet header 49 and does not enter tanks 14A.

As soon as this back flow commences, the flap valves 36 and 47 close so that the effluent under pressure has to pass through the conduits 41 and 25, via the reverse flow cleaning portions 44 and 29 respectively. As both of these portions are closed at the one end as shown at 38, the clear effluent under pressure is forced upwardly through the perforated separator baffles 42 and 27 thus removing any flocculated material 53 which has been collected by baffles 45 and any flocculated material which may have lodged within the agitating baffles 30 and 30A. This washed away flocculated material discharges via conduits 60 and 61 to a common conduit 62. Conduit 60 is connected to the baffle chamber 26 and conduit 61 to the inlet header 21.

A gate valve 63 is open under these conditions so that this effluent carrying the flocculated material flows via conduit 64 back to the primary treatment area 12 where it settles out by gravity.

This means that the modules 13 and 14 can be cleaned on a regular basis depending upon the amount of flocculated material collected thereby.

The collection of solids, of course, is conventional and these are more readily disposed of than highly contaminated sewage effluent normally remaining after conventional treatments.

Reference character 65, in FIG. 1, illustrates schematically a chlorination unit for post-treatment of effluent prior to passing to the reservoir 55. Also shown in FIG. 1 is an air line 66 to aerate the chamber 26 if required, line 66 being connected to a source of compressed air which, of course, is conventional.

Finally it should be noted that the system will reduce lagoon holding requirements by one-half or better by having the system on a continuous flow, due to the fact that over 80 percent of sewage is liquid. With the present system it would not be necessary to hold this liquid for long periods as is the case with present lagoons thus giving a reduction in land costs, reduction in lagoon construction costs and, of course, a reduction of unsightly ponds and odors.

Various modifications can be made within the scope of the inventive concept which is herein disclosed and/or claimed.

What I claim as my invention is:

1. A secondary sewage treatment apparatus comprising in combination means to add a flocculating chemical to said sewage, means to agitate said sewage and said chemical to thoroughly mix same, and means to separate the flocculated material from the liquid effluent, said means to agitate said sewage and said chemical comprising an agitating module, said module including a casing, an intake header at one end of said casing, an outlet baffle chamber at the other end of said casing and a plurality of conduits in said casing communicating between said header and said baffle chamber, each of said conduits including a plurality of baffles extending from the walls thereof to agitate sewage passing therethrough, and a substantially horizontal perforated partition baffle spanning each of said conduits lengthwise and separating each of said conduits into a normal flow agitating portion above said partition baffle and a reverse flow cleaning portion below said partition baffle, said plurality of baffles being located in said normal flow agitating portion, and a hinged, effluent-flow-operated flap valve hinged on the discharge ends of each said conduits for closing off said normal flow agitating portions when effluent is flowing in a direction opposite to the normal direction of flow and for opening said normal flow agitating portion when said effluent is flowing in the normal direction of flow.

2. The apparatus according to claim 1 in which said plurality of baffles includes at least one inclined baffle extending part way across said conduits and being inclined at an angle towards the normal direction of flow of sewage therethrough, at least one vertically situated baffle extending part way across said conduits and spaced from said one inclined baffle, and at least one further baffle similar in configuration to said one inclined baffle but being in opposed relationship therewith and spaced from said vertically situted baffle upon the other side thereof, said further baffle also being inclined at an angle towards the normal direction of flow of sewage therethrough.

3. The apparatus according to claim 1 in which said means to separate the flocculated material from the liquid effluent comprises a flocculent module, said flocculent module including a casing, an intake baffle chamber at one end of said casing, and an outlet header at the other end of said casing, and a plurality of conduits in said casing communicating between said baffle chamber and said header, each of said conduits including a plurality of spaced and parallel perforated baffles extending part way across each said conduits, and inclined at an angle towards the normal flow of sewage therethrough.

4. The apparatus according to claim 3 in which said flocculating module includes a substantially horizontal perforated partition baffle spanning each of said conduits lengthwise and separating each of said conduits into a normal flow flocculent trapping portion above said partition baffle and a reverse flow cleaning portion below said partition baffle, said plurality of baffles being secured to said partition baffle and extending into said flocculent trapping portion and terminating spaced from the upper wall of each said conduits, and a hinged effluent-flow-operated flap valve on the discharge ends of each of said conduits for closing off said flocculent trapping portions.

5. The apparatus according to claim 3 in which said outlet baffle chamber of said agitating module is connected with said inlet baffle chamber of said flocculent module.

6. The apparatus according to claim 4 in which said outlet baffle chamber of said agitating module is connected with said inlet baffle chamber of said flocculent module.

7. The apparatus according to claim 5 which includes a perforated flow control baffle spanning the junction between said outlet baffle chamber of said agitating module and said inlet baffle chamber of said flocculent module.

8. The apparatus according to claim 6 which includes a perforated flow control baffle spanning the junction between said outlet baffle chamber of said agitating module and said inlet baffle chamber of said flocculent module.

* * * * *